United States Patent

Cash, Jr. et al.

[15] 3,669,861

[45] June 13, 1972

[54] R. F. DISCHARGE CLEANING TO IMPROVE ADHESION

[72] Inventors: John H. Cash, Jr.; Joe P. Keene, both of Richardson, Tex.

[73] Assignee: Texas Instruments Incorporated, Dallas, Tex.

[22] Filed: Aug. 28, 1967

[21] Appl. No.: 663,707

[52] U.S. Cl. ........................................ 204/192
[51] Int. Cl. ........................................ C23c 15/00
[58] Field of Search ........................................ 204/192

[56] References Cited

UNITED STATES PATENTS

| | | | |
|---|---|---|---|
| 3,361,659 | 1/1968 | Bertelsen | 204/192 |
| 3,324,019 | 6/1967 | Laegreid et al. | 204/192 |
| 3,282,816 | 11/1966 | Kay | 204/192 |
| 3,233,137 | 2/1966 | Anderson et al | 204/192 |
| 3,021,271 | 2/1962 | Wehner | 204/192 |
| 2,146,025 | 2/1939 | Penning | 204/298 |

OTHER PUBLICATIONS

Davidse, " Theory and Practice of RF sputtering" Vacuum, Vol. 17, No. 3, pgs. 139- 145

Holland, Vacuum Deposition of Thin Films, London, 1963, pgs. 74 to 77, 81 and 82

*Primary Examiner*—John H. Mack
*Assistant Examiner*—Sidney S. Kanter
*Attorney*—Samuel M. Mims, Jr., James O. Dixon, Andrew M. Hassell, Harold Levine, John E. Vandigriff, Melvin Sharp and James C. Fails

[57] ABSTRACT

A method of cleaning a semiconductor substrate in an inert gas atmosphere by use of R. F. energy is disclosed. The field of R. F. energy is controlled by a magnetic field which is perpendicular to the electric field of the R. F. .energy. Preferably, the R. F. energy is at a frequency of 13.560 MHz with a power of approximately 500 watts.

3 Claims, 5 Drawing Figures

INVENTORS
JOE PERRY KEENE
JOHN HARLEY CASH, JR.
BY John E. Vandigriff
ATTORNEY

R. F. DISCHARGE CLEANING TO IMPROVE ADHESION

Disclosed is a method for cleaning a substrate and the deposition of material thereon in a high vacuum system in which a gas is ionized and the material is sputtered with a high frequency voltage.

In the application of films to a substrate, it is necessary that the substrate be clean prior to the application of the film. If the substrate is not clean, the film will not properly adhere and will peel from the substrate.

The methods of cleaning may generally be divided into two groups, cleaning outside a vacuum chamber and cleaning inside the chamber. However, both of these processes have their own individual problems; for example, when cleaning is done outside a vacuum chamber by a chemical cleaning process, the cleaning is not completely successful because contamination may be redeposited on the substrate and transferred into the vacuum chamber. Cleaning inside the vacuum chamber may be by heating the substrate to a high temperature to obtain a clean surface; however, the time cycle of such a process is long and impurities such as oil from the vacuum pump may be deposited upon the substrate during the cleaning process.

The cleaning within the vacuum chamber, however, has the advantage that after the substrate has been cleaned, the material then may be deposited on the substrate, thereby preventing contamination of the substrate between the cleaning process and the deposition process.

The present invention relates to a method of cleaning a substrate prior to deposition and the method of deposition, all of which takes place within a vacuum chamber having very low pressure and an applied RF voltage. The vacuum chamber is filled with an inert gas which is ionized during the cleaning and deposition processes. The pressure used is much lower than that previously used and cannot be used with a 60-cycle a-c glow discharge, which has been used in the prior art. Reduction of the pressure to a lower level decreases he possibility of contamination by oil or other material in the system. Another advantage which results from the use of the present invention is that the substrate which is to be cleaned and coated with a thin film does not have to be heated by the application of heat to the support upon which the substrate is mounted.

An additional feature of the invention is that a magnetic field is established perpendicular to the electric field created between the electrodes by the RF voltage applied thereto. This is in contrast to that which has been used in the past, in which the electric field and the magnetic field are in the same direction. One resultant advantage is that the substrate stays much cooler because some of the energy is carried out by electrons spiraling around the magnetic field lines. These electrons do not strike the substrate, thereby not adding any heat thereto.

The novel features characteristic of this invention are set forth in the appended claims. The invention itself, as well as other objects and advantages thereof, may be best understood by reference to the following detailed description of illustrative embodiments, when read in conjunction with the accompanying drawing wherein:

Figures 1, 2, 3, 4, 5:
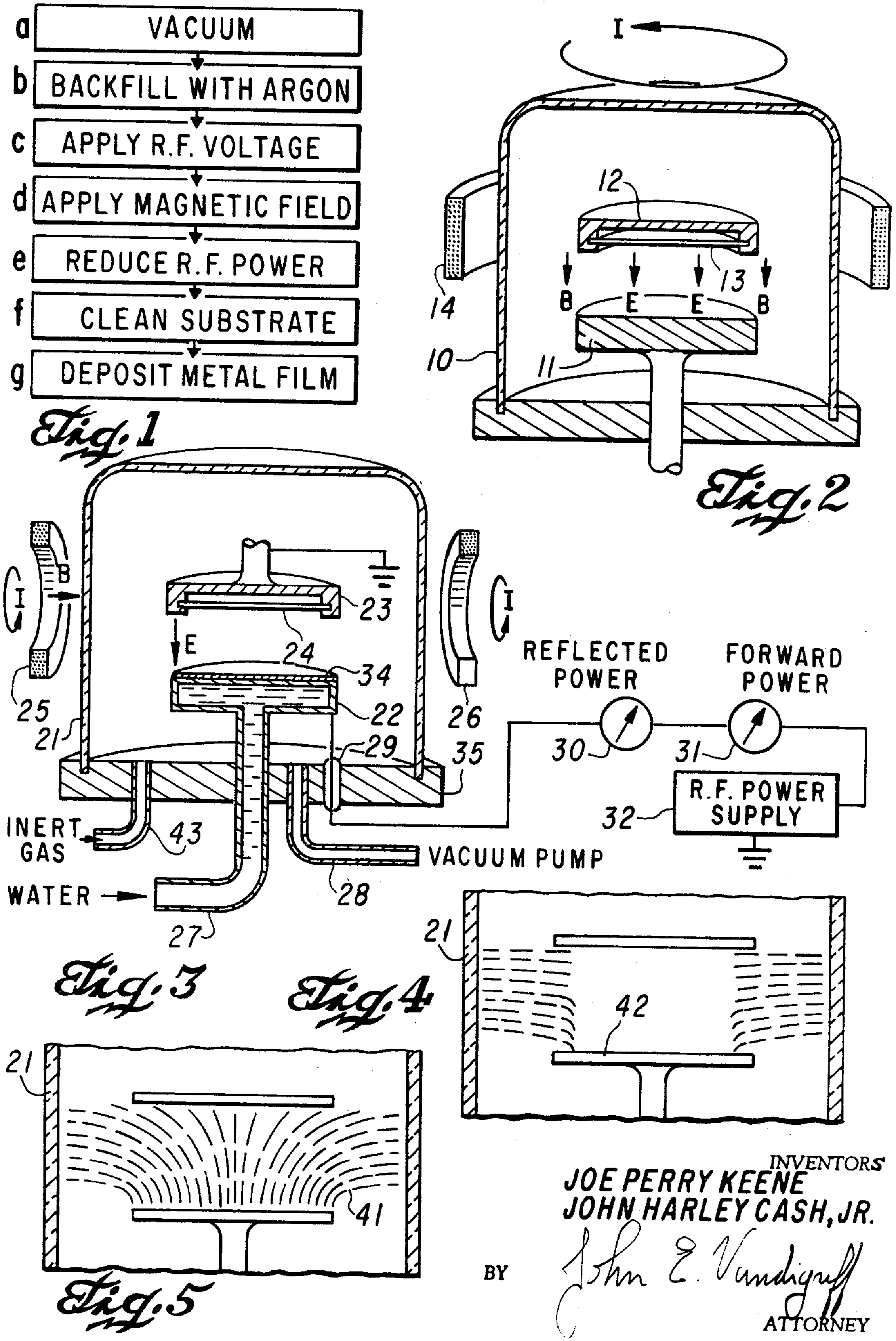
FIG. 1 is a block flow diagram illustrating a series of steps which may be used in practicing the invention.
FIG. 2 shows a cross-sectional view of a vacuum system and the arrangement of the magnetic coil used in the prior art.
FIG. 3 is a cross-sectional view showing the vacuum system and arrangement of the magnetic coils according to the present invention.
FIG. 4 is a cross-sectional view of the portion of the vacuum chamber, showing the distribution of a glow discharge during the cleaning process.
FIG. 5 is a partial view of the vacuum system, showing the distribution of glow discharge during the deposition process.

Referring now to the drawing, FIG. 1 shows a block process flow diagram illustrating the basic steps used in cleaning the substrate and depositing the metal film thereon. After the substrate has been placed in a vacuum chamber, the pressure is reduced (Block *a*) to or below about $2 \times 10^{-4}$ torr. The chamber is backfilled with a gas or mixture of gases (Block *b*). For example, gases such as argon, krypton, xenon, nitrogen and oxygen have been used. Nitrogen is generally used when a silicon nitride film is deposited on a substrate. When it is desirable to deposit oxides of metals, some oxygen is used to provide an oxidizing environment. After the required pressure has been reached, an RF voltage is applied (Block *c*) between electrodes in the vacuum chamber to ignite a glow discharge. It should be noted that the pressure in the system is about two orders of magnitude lower than would be used to ignite a glow discharge with a 60-cycle a-c voltage. Reduction of the pressure to this lower level decreases the possibility of contamination from oil or other materials in the system. A magnetic field is applied (Block *d*) to the system, as will be hereinafter explained. Next, the power is reduced (Block *e*) below that originally applied to ignite the glow discharge, and under the reduced power, the substrate is then cleaned by ion bombardment (Block *f*). After the substrate is cleaned, the desired material is deposited on the substrate (Block *g*).

FIG. 2 illustrates a vacuum system 10 in which depositions have been made according to prior art. While the vacuum system is generally the same, pressures have not been used as low as the pressure in the present invention, and the magnetic field has been placed in a direction parallel to the electric field between the two electrodes 11 and 12, as illustrated. The coil 14 creating the magnetic field encircles the vacuum system with the center of the magnetic coil being coaxial with the center of the electrodes within the system. Placing the coil in such a position to the magnetic field parallel to the electric field provides several disadvantages which will be discussed below with reference to the apparatus used in the present invention.

Referring to FIG. 3, there is illustrated a system for cleaning substrates and depositing film according to the present application. Shown in a cross sectional view of the vacuum chamber 21 mounted on the base 35. In the chamber are electrodes 22 and 23. Electrode 22 may be, for example, water cooled, as shown at 27 with the water entering into the electrode. Since a voltage is applied to the electrode 22, it is arranged so that water cooling portion is electrically insulated from the electrode; such means of cooling are well known in the art. The substrate 24 is mounted on anode-electrode 23 and the material to be deposited on the substrate 24 is placed upon cathode-electrode 22. The vacuum pump may be attached to the system as shown at 28 and a gas inlet is illustrated at 43. Power is applied through the base 35 by feedthrough 29.

One feature of the invention is that the two coils 25 and 26 do not enclose the vacuum chamber as does the single coil in FIG. 2, but are separated by the vacuum chamber and are arranged parallel to each other, so that the magnetic field crosses between the coils through the vacuum system and is perpendicular to the electric field E created between the two electrodes 22 and 23 when the voltage is applied thereto.

In a comparison of the two systems, it should be noted that in the system in FIG. 2, the magnetic field B is parallel to the electric field, and the center of the coil corresponds to the location of the substrate which is mounted upon electrode 23. The axis of the coil is coaxial with the axis of the electrode. The magnetic field at the center is high and concentrated between the cathode 12 and the anode 11 of the system.

In contrast, the magnetic flux in the system shown in FIG. 3 is perpendicular to the electrical field. The axis of the coils passes through the anode-substrate region. However, as pointed out, it is not parallel to, but perpendicular to the electric field. This particular configuration is called a "Helmholtz" arrangement when the separation of the coils is equal to the diameter of one coil. The magnetic field value for the two-coil arrangement is one-third the value at the center of the single coil arrangement for a given current. Certain advantages lie in this configuration. Substrates stay cooler because some of the energy is apparently carried out by electrons spiraling around the magnetic field lines. These electrons do not strike the substrate, thereby not adding heat thereto. Tests have been made, and it was found that a substrate heated up to 300° C with the system used in FIG. 2, whereas in the system used in FIG. 3 the substrate only heated to about 170° C. In both cases, all conditions were the same except that the direction of the magnetic field was parallel in the 300° case and perpendicular to electric field in the 170° case.

The apparatus shown in FIG. 3 may be utilized for deposition of various materials upon various substrates, for example: a semiconductor substrate may be placed at 24 and metal films deposited thereon to form contacts and interconnections thereon. Various metals may be used to coat other metals or even metals that may be coated with a ceramic material such as alumina $Al_2O_3$.

One specific cleaning and deposition process is as follows: a silicon substrate is placed on the electrode 23 and the chamber is pumped to a vacuum of $2 \times 10^{-6}$ torr. The electrodes 22 and 23 are spaced 1⅛ inches apart for this particular example. The chamber is then backfilled to 5 millitorr with argon and then pumped to $2 \times 10^{-6}$ torr again. The system is then a second time backfilled to 5 millitorr with argon. A glow discharge is ignited using an RF power of approximately 500 watts as indicated on forward power meter at 13.560 MHz. It should be noted that this is the ISM frequency specified by the Federal Communication Commission to be used as an industrial frequency. The process is not limited to this frequency; however, since this is an approved industrial frequency, it is the one that was used in the process.

After a flow discharge is established and a magnetic field, for example about 70 gauss, is established, the pressure is reduced to about $2 \times 10^{-4}$ torr and the power reduced to 250 watts. In the system illustrated, the reflected power measured by meter 30 indicated 50 watts. This condition is held for about 10 minutes. During this period, the substrate is subjected to ion bombardment due to the ionization of the argon gas. It should be noted that the substrate 24 is mounted upside-down so that any impurities in the system which may settle down will not fall upon the substrate; in this manner, optimum cleaning is achieved. Before the process the material to be deposited shown at 24 in FIG. 3 may be placed in the system, since during the cleaning process the conditions for sputtering material do not exist. That is, there is no danger of applying material 34 to the substrate during the cleaning step.

After the substrate is cleaned, the reflected power is then minimized and the forward power brought up to about 500 watts and the pressure is stabilized at about 5 millitorr of argon, and the material at 34 is then sputtered, coating the substrate. When molybdenum was used for material 34, it was deposited at an approximate rate of 1,000 A. per minute.

In order to test the adhering strength of the molybdenum, the substrate was cleaned as set forth in the prior example, and the deposition step was maintained for 28 minutes, after which the substrate was removed from the chamber to determine if there was any peeling of the molybdenum from the substrate. Pressure sensitive tape was applied over the film and then removed to see if the film would adhere to the tape. The films passed the test, as none of the molybdenum was pulled from the substrate. A step was etched in the film and the film was measured for thickness. The total thickness of the film was 110 microinches or 27,940 A. This showed, as in the example above, that the deposition rate of the molybdenum was approximately 1,000 A. per minute.

In another example, a triple layer of material was deposited this being molybdenum, gold, and molybdenum. The substrate was placed in a vacuum at approximately $8 \times 10^{-7}$ torr. The substrate was then cleaned, using the glow discharge process described in the previous example. After the substrate was cleaned, molybdenum was deposited for about 2 minutes at about 500 watts. The chamber was opened, and the molybdenum was replaced with gold and then re-evacuated to $8 \times 10^{-7}$. The molybdenum surface was then cleaned, and gold was deposited for 20 minutes at 500 watts. The gold was then replaced with molybdenum, and the same process carried out, depositing molybdenum for 3 minutes at 500 watts. There was no evidence of peeling of any of the layers.

In the apparatus shown in FIG. 3, molybdenum, gold, aluminum, silicon dioxide, and various other materials have been deposited, using the above - described process. Table 1 shows various materials and the power levels at which they were deposited.

| Material | Deposition Power (Watts) |
|---|---|
| Molybdenum | 500 |
| Aluminum | 500 |
| Gold | 500 |
| Silicon Nitride | 1,000 |
| Silicon Dioxide | 1,000 |
| Quartz | 1,000 |
| Barium Titinate | 500 |

It should be noted that in the cleaning and deposition process, the glow discharge is distorted by the placement of the magnetic coils on the side of the chamber. As will be noted in FIGS. 4 and 5, the ionized gas 41 was pulled to the inner wall of the chamber. When the pressure is reduced for the cleaning step, the dark regions which normally exist adjacent the electrodes, extended up from the cathode to the anode, as illustrated in FIG. 4. When the pressure is increased for the deposition process, the glow discharge extends throughout the region between the electrodes and to the inner walls of the chamber, as shown in FIG. 5. At all times, it should be noted that there is a small dark place adjacent the anode and cathode. These dark regions were extended through the electrode spacing by lowering the pressure during the cleaning steps.

The distortion of the magnetic field and the glow discharge caused heating of the wall at the point adjacent the axis to a temperature of about 100° C. Thus, by causing the heat to be drawn to the wall, the heating of the substrate is minimized, thereby removing the possible requirement of cooling the substrate holder.

Specific examples have been used showing the deposition of molybdenum and gold materials upon silicon substrates. However, this method may be used to deposit most any material upon any substrate. Exact power used for deposition, and times used in obtaining various film thicknesses will vary with the particular apparatus used and the pressure within the system. However, these operating parameters are easily ascertained for the particular materials that are to be deposited. It should be noted that the higher the frequency used for the Rf voltage, the lower the ionization point of a gas for a given vacuum pressure. Therefore, those specifically given here are not limitations but only optimum values used for the conditions set forth in the specific examples.

Although the present invention has been shown in illustrative terms of specific examples and materials, it will be apparent that changes and modifications of the process depending upon the various materials used may be made without departing from the spirit and scope of the invention as defined in the appended claims.

What is claimed is:

1. A method of predeposition cleaning of a substrate in a vacuum system having two electrodes, comprising the steps of: mounting a substrate on one of the electrodes; reducing the pressure to less than $2 \times 10^{-6}$ torr; filling the system to 5 millitorr with argon; reducing the pressure again to at least $2 \times 10^{-6}$ torr; backfilling the system with 5 millitorr argon; igniting a glow discharge between said electrodes, using an R. F. power of approximately 500 watts at 13,560 MHz; reducing the pressure to approximately $2 \times 10^{-4}$ torr; reducing the power to approximately 250 watts and maintaining conditions for about 10 minutes, so that the glow discharge will cause ionization of the argon and clean the substrate.

2. The method according to claim 1, wherein a magnetic field is applied perpendicular to an electric field created by the RF voltage.

3. The method according to claim 1, wherein said RF power is reduced until a dark area between said glow discharge and one of said electrodes extends to the other electrode.

* * * * *